(12) United States Patent
Seiki

(10) Patent No.: US 6,892,847 B2
(45) Date of Patent: May 17, 2005

(54) SADDLE RIDING VEHICLE

(75) Inventor: Bunzo Seiki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/175,882

(22) Filed: Jun. 21, 2002

(65) Prior Publication Data

US 2003/0000764 A1 Jan. 2, 2003

(30) Foreign Application Priority Data

Jun. 29, 2001 (JP) ........................................ 2001-198991

(51) Int. Cl.$^7$ ............................................. B60K 17/22
(52) U.S. Cl. ....................................................... 180/376
(58) Field of Search ................................ 180/376, 348, 180/358

(56) References Cited

U.S. PATENT DOCUMENTS

| | | | | | |
|---|---|---|---|---|---|
| 2,198,352 | A | * | 4/1940 | Tjaarda | 180/376 |
| 2,198,353 | A | * | 4/1940 | Tjaarda | 180/376 |
| 2,198,354 | A | * | 4/1940 | Tjaarda | 180/376 |
| 4,249,631 | A | * | 2/1981 | Huneke | 180/255 |
| 4,632,203 | A | * | 12/1986 | Krude | 180/359 |
| 4,669,571 | A | * | 6/1987 | Kurde | 180/348 |
| 4,671,370 | A | * | 6/1987 | Krude | 180/348 |
| 4,697,662 | A | * | 10/1987 | Zollmeyer et al. | 180/256 |
| 4,766,969 | A | * | 8/1988 | Mishio et al. | 180/381 |
| 4,771,842 | A | * | 9/1988 | Mishio et al. | 180/376 |
| 4,974,697 | A | * | 12/1990 | Krude | 180/348 |
| 5,911,286 | A | * | 6/1999 | Boutin | 180/359 |
| 6,095,005 | A | * | 8/2000 | Tanzer et al. | 74/390 |

FOREIGN PATENT DOCUMENTS

JP          7-41857         5/1995

* cited by examiner

Primary Examiner—Teri Pham Luu
Assistant Examiner—Bret Hayes
(74) Attorney, Agent, or Firm—Birch Stewart Kolasch & Birch, LLP (57) ABSTRACT

A saddle riding vehicle including an engine mounted at the center of the vehicle body frame, a saddle seat mounted above the engine, and rear wheels mounted on both sides of the rear portion of the vehicle body frame. The power of the engine is transmitted to the rear wheels via a propeller shaft and a final speed reducer, and the propeller shaft is provided with a rising gradient from the engine toward the final speed reducer. As a result, the final speed reducer can be disposed in an upper position. In other words, the final speed reducer can be disposed at a high position from the ground, so that a sufficient suspension stroke is obtained. As a consequence, the design freedom or layout freedom of the vehicle is expanded.

14 Claims, 11 Drawing Sheets

FIG. 11 PRIOR ART

SADDLE RIDING VEHICLE

CROSS-REFERENCE TO RELATED APPLICATIONS

The present application claims priority under 35 U.S.C. §119 to Japanese Patent Application No. 2001-198991, filed on Jun. 29, 2001, the entire contents thereof are hereby incorporated by reference.

BACKGROUND OF THE INVENTION

1. Field to of the Invention

The present invention relates to a saddle riding or saddle riding type vehicle having an engine mounted at the center of the vehicle body frame and a saddle seat provided above the engine.

2. Description of Background Art

Figure 8:
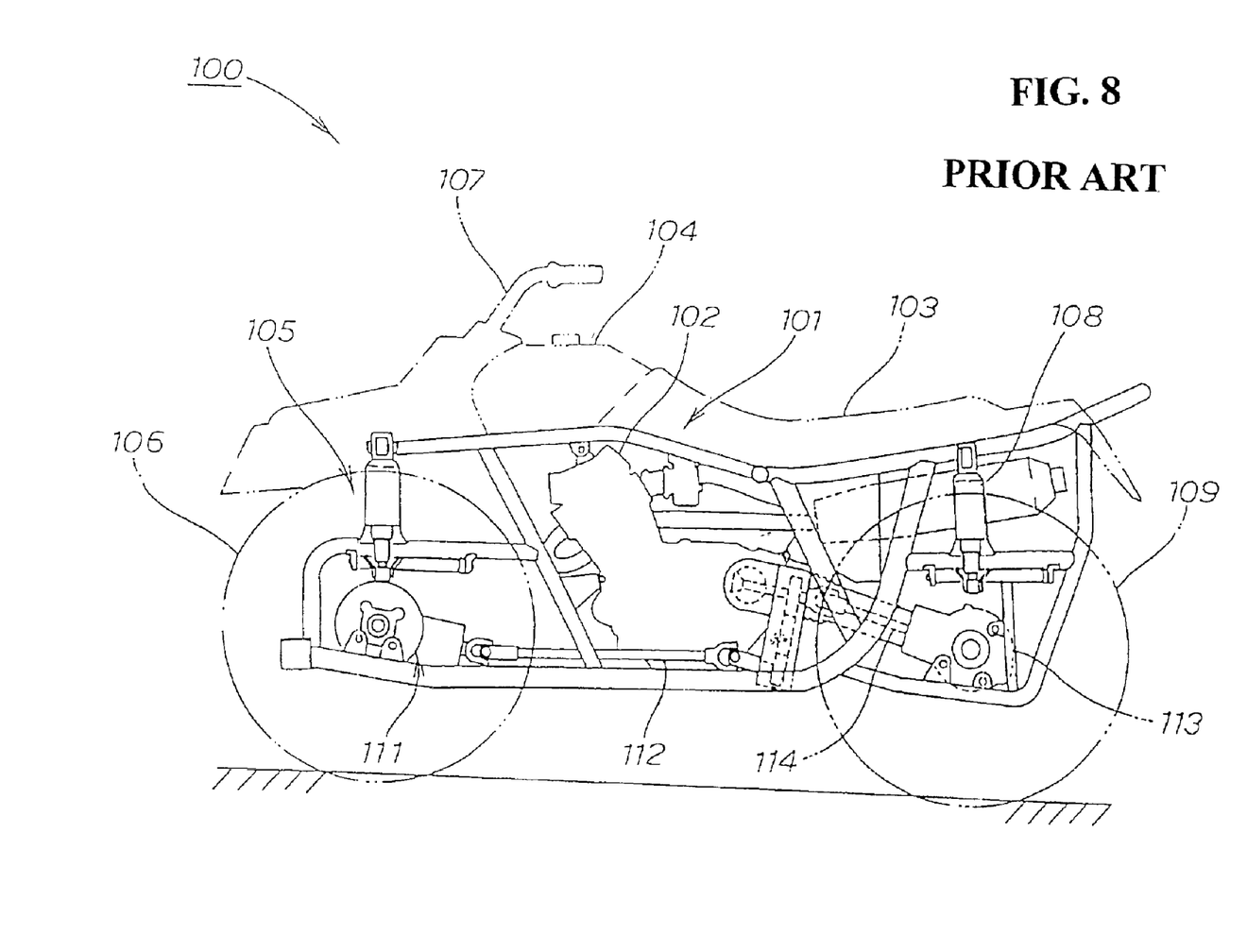
FIG. 8 is a side view of the saddle riding type vehicle of the related art.

FIG. 8 is a side view of the saddle riding type vehicle of the related art, wherein the saddle riding type vehicle 100 mainly comprises a vehicle body frame 101, an engine 102 mounted at the center of the vehicle body frame 101, a saddle seat 103 provided above the engine 102, a fuel tank 104 disposed forwardly of the saddle seat 103, and front wheels 106, 106 (106 on the far side is not shown) rotatably mounted on the sides of the front portion of the vehicle body frame 101 via suspension mechanisms 105, 105 (105 on the far side is not shown). Further included are a steering 107 for steering the front wheels 105, 105, rear wheels 109, 109 (109 on the far side is not shown) rotatably mounted on both sides of the rear portion of the vehicle body frame 101 via suspension mechanisms 108, 108 (108 on the far side is not shown), a front propeller shaft 112 for transmitting rotary power of the engine 102 to a final speed reducer 111 on the side of the front wheels 106, 106, and a rear propeller shaft 114 for transmitting rotary power of the engine 102 to a final speed reducer 113 on the side of the rear wheels 109, 109.

The saddle riding type wheel 100 also comprises a propeller shaft 114 connected between the engine 102 and the final speed reducer 113 on the side of the rear wheel 109 with a falling gradient and an engine 102 disposed at the high position of the vehicle. Therefore, it is desirable to lower the center of gravity of the vehicle by disposing the engine 102 at the lower position.

On the other hand, since the final speed reducer 113 is disposed at the lower position, the height of the final speed reducer 113 from the ground decreases. As a consequence, it is difficult to ensure sufficient suspension stroke of the rear wheel 109. The term "suspension stroke" means the distance of movement of the wheel from a state in which the wheel is pushed up and the suspension is compressed to the maximum extent to a state in which the suspension is expanded to the maximum extent.

Figure 9:
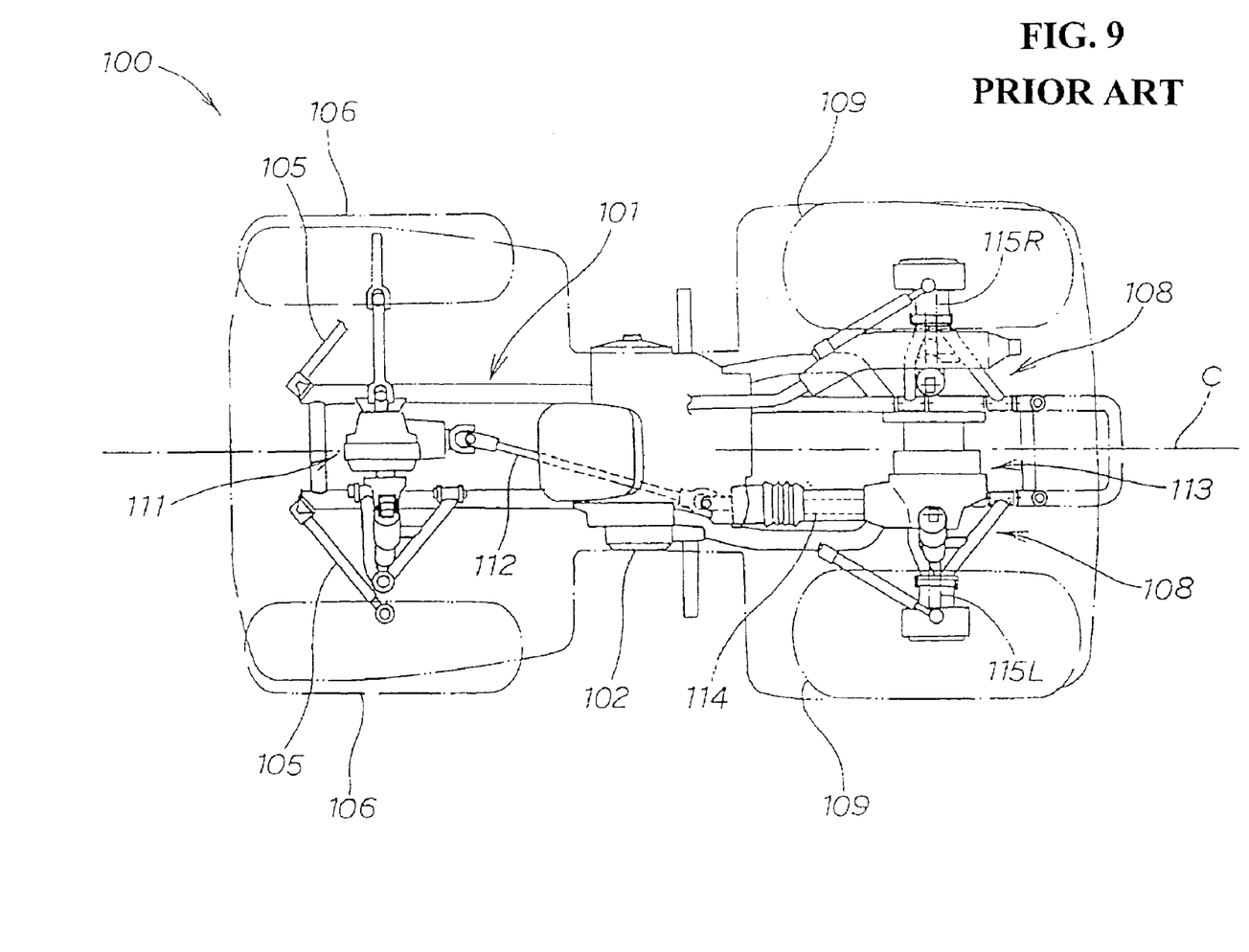
FIG. 9 is a plan view of the saddle riding type vehicle of the related art.

FIG. 9 is a plan view of the saddle riding type vehicle of the related art, and it is preferable that the saddle riding type vehicle 100 comprises a rear propeller shaft 114 being disposed from the engine 102 toward the final speed reducer 113 in almost parallel with the centerline of the vehicle body C and the final speed reducer 113 is disposed at the position closer to the left rear wheel 109.

When the rear final speed reducer 113 is disposed closer to the left rear wheel 109, the left drive shaft 115L is shorter than the right drive shaft 115R, and thus it is difficult to ensure a sufficient amount of movement of the wheel in the vertical direction. As a consequence, the suspension stroke of the rear wheels 109, 109 is limited.

Therefore, the inventor sought further enlightenments and proposed patent application Ser. No. 373986/2000 entitled "A SADDLE RIDING TYPE VEHICLE" as an improved technology relating to saddle riding type vehicles of the related art. The principal portions of this technology will be described in conjunction with FIG. 10 and FIG. 11.

Figure 10:
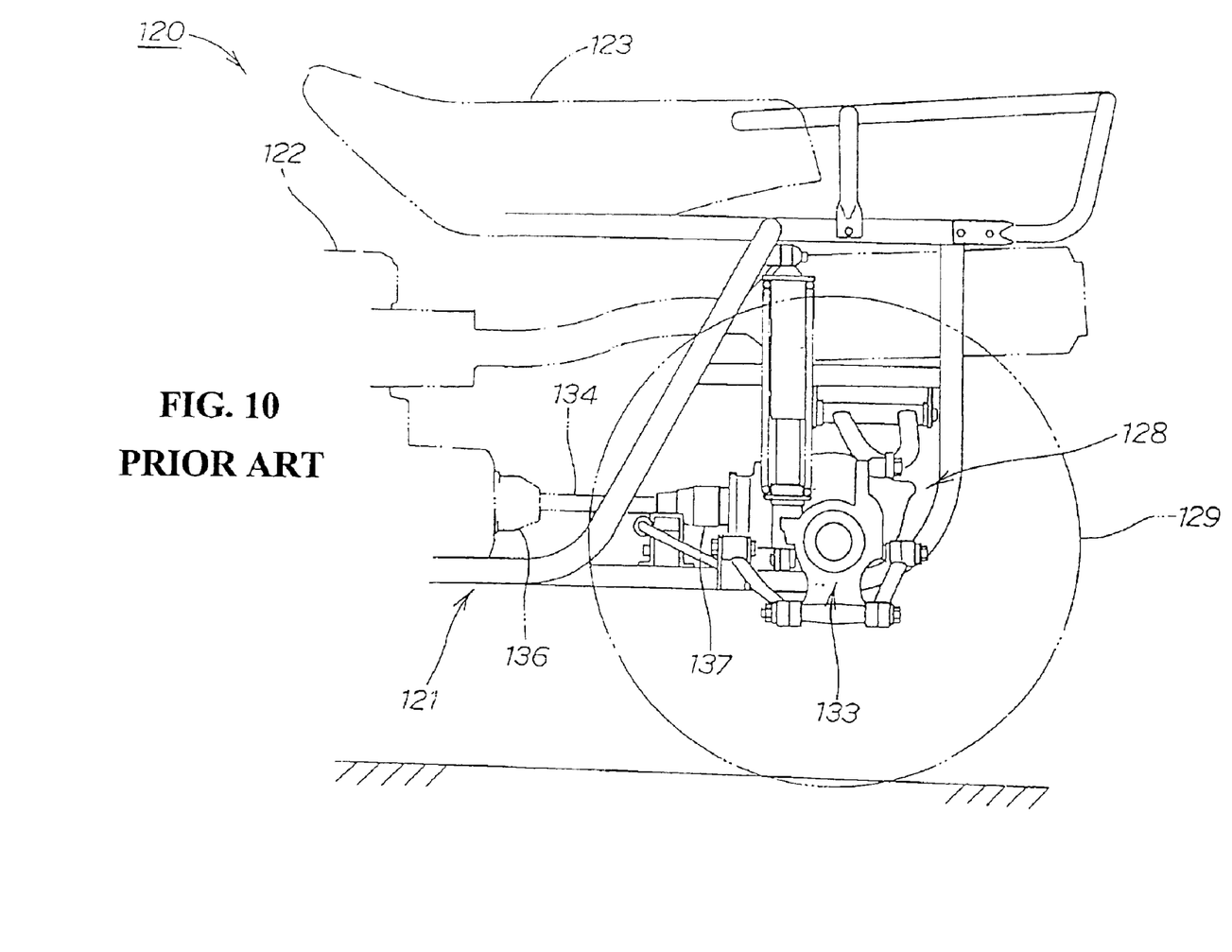
FIG. 10 is a side view showing the layout of the propeller shaft in the saddle riding type vehicle proposed in the preceding application.

FIG. 10 is a side view showing the layout of the propeller shaft of the saddle riding type vehicle proposed in the proceeding application, in which the saddle riding type vehicle 120 comprises a propeller shaft 134 connected to the engine 122 side via a coupling 136 at one end and to the final speed reducer 133 via a coupling 137 at the other end, and disposed in substantially parallel to the ground. As a consequence, the engine 122 could be disposed at the lower position, and thus the center of gravity could be lowered.

By arranging the propeller shaft 134 in substantially parallel to the ground, the final speed reducer 133 can be moved upward, and thus the suspension stroke could be improved. In the figure, the reference numeral 121 designates a vehicle body frame, the numeral 123 designates a saddle seat, the numeral 128 designates a suspension mechanism, and the numeral 129 designates a rear wheel.

Figure 11:
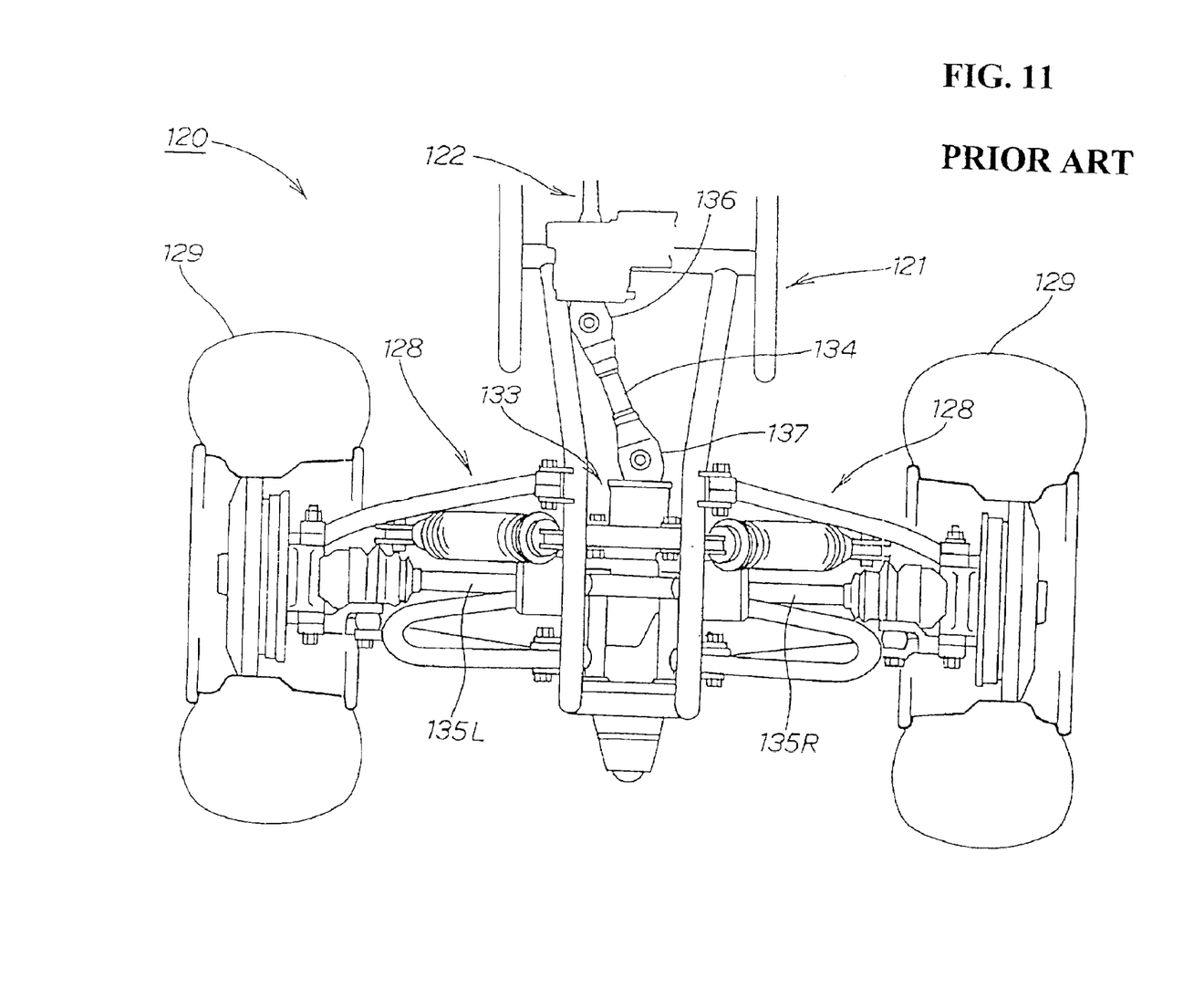
FIG. 11 is a plan view showing the layout of the propeller shaft in the saddle riding type vehicle proposed in the preceding application.

FIG. 11 is a plan view showing the layout of the propeller shaft of the saddle riding type vehicle proposed above, in which the saddle riding type vehicle 120 was improved in the amount of movement of the wheels in the vertical direction by arranging a final speed reducer 133 at the center of the vehicle, and equalizing the lengths of the left and right drive shafts 135L, 135R. As a consequence, since the propeller shaft 134 had to be disposed diagonally, one each of the coupling for the side of the engine 122 and for the side of the final speed reducer 133, that is, two couplings 136, 137 in total were necessary.

In the saddle riding type vehicle 120 described above, the center of gravity was lowered and the suspension stroke was improved by disposing the propeller shaft in substantially parallel with the ground in side view and thus arranging the engine 122 at the lower position. However, it is desired to give further room for the suspension stroke to prevent limiting of the design or the layout.

In the saddle riding type vehicle 120 described above, the propeller shaft 134 is disposed by providing the couplings 136 and 137 on the side of the engine 122 and on the side of the final speed reducer 133 respectively. However, it is necessary to simplify the mechanism for transmitting power.

SUMMARY AND OBJECTS OF THE INVENTION

Accordingly, it is an object of the present invention is to provide a technology in which a sufficient suspension stroke can be obtained and the power transmitting mechanism can be simplified.

In order to achieve the object described above, according to the present invention, a saddle riding type vehicle comprises an engine mounted at the center of the vehicle body frame, a saddle seat provided above the engine, and rear wheels mounted on both sides of the rear portion of the vehicle body frame, and a propeller shaft being provided with a rising gradient from the engine to a final speed reducer, wherein power of the engine is transmitted to the rear wheels via the propeller shaft and the final speed reducer.

By providing the propeller shaft a rising gradient from the engine toward the final speed reducer, the final speed reducer is provided at the upper position, that is, the final speed reducer is disposed at the high position from the ground, so that the sufficient suspension stroke is obtained. As a consequence, the design freedom or layout freedom is expanded.

By providing the propeller shaft with a rising gradient from the engine toward the final speed reducer, the heavy engine is disposed at the lower position of the vehicle body frame, so that the center of gravity can further be lowered.

Further, according to the present invention, the final speed reducer is directly connected to the propeller shaft by bringing the transmission shaft on the side of the final speed reducer for transmitting driving force from the propeller shaft in line with the axis of the propeller shaft.

For example, when the transmission shaft on the side of the final speed reducer is not brought in line with the axis of the propeller shaft, it is necessary to connect the propeller shaft to the final speed reducer via a coupling or the like. Therefore, the transmission shaft on the side of the final speed reducer is brought in line with the axis of the propeller shaft to connect the final speed reducer directly to the propeller shaft. As a consequence, for example, the coupling can be eliminated, and thus the construction may be simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the drawings, the embodiments of the present invention will be described in detail. The terms "front", "rear", "left", "right", "upper", and "lower" mean the directions viewed from the driver, and the reference sign Fr represents the front side, Rr represents the rear side, L represents the left side, and R represents the right side. The drawings are to be viewed in the orientation in which the reference numerals and signs can be seen in the right way.

Figure 1:
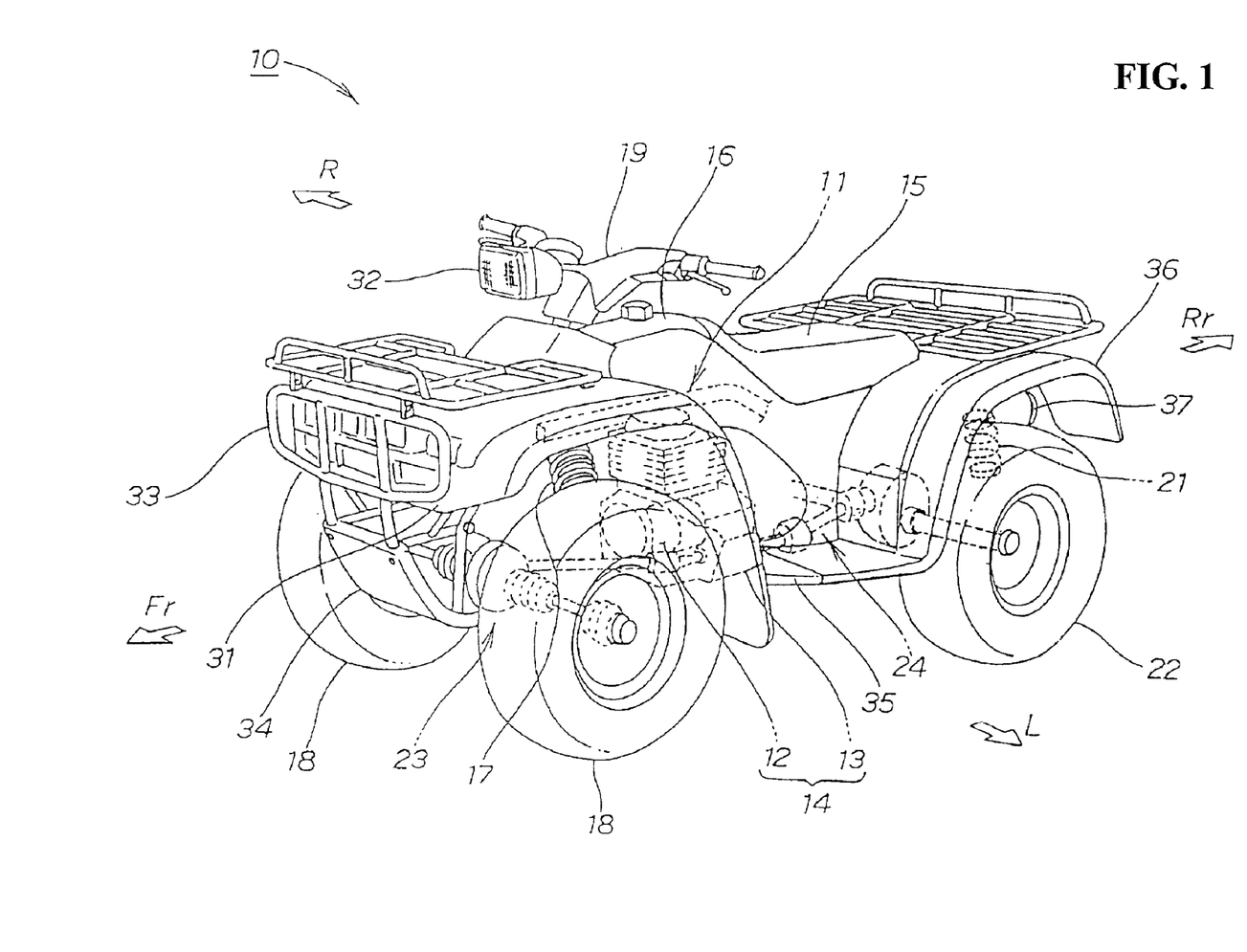
FIG. 1 is a perspective view of a saddle riding type vehicle according to the present invention.

FIG. 1 is a perspective view of the saddle riding type vehicle according to the present invention, and the saddle riding type vehicle 10 is a vehicle mainly comprising a vehicle body frame 11, a power unit 14 including an engine 12 mounted at the center of the vehicle body frame 11 and a transmission 13, a saddle seat 15 mounted above the power unit 14, a fuel tank 16 disposed forwardly of the saddle seat 15, front wheels 18, 18 rotatably mounted on the sides of the front portion of the vehicle body frame 11 via the left and right suspension mechanisms 17, 17 (17 on the far side is not shown). Further included are a steering handle 19 for steering the front wheels 18, 18, rear wheels 22, 22 (22 on the far side is not shown) rotatably mounted on the sides of the rear portion of the vehicle body frame 11 via the left and the right suspension mechanisms 21, 21 (21 on the far side is not shown), a front power transmitting mechanism 23 for transmitting rotary power of the engine 12 to the front wheels 18, 18, and a rear power transmitting mechanism 24 for transmitting rotary power of the engine 12 to the rear wheels 22, 22.

Also included are a front fender 31, a head lamp 32, a front bumper 33, an under cover 34, a floor step 35, a rear fender 36, and a muffler 37.

The saddle riding type vehicle 10 is a four-wheel buggy, or All Terrain Vehicle (ATV). Since it has a light and compact vehicle body and a tight turning circle, and is easy to operate. It is an off-road vehicle exclusively, suitable for transfer in agriculture, cattle breeding, hunting, or safeguarding, or for leisure.

Figure 2:
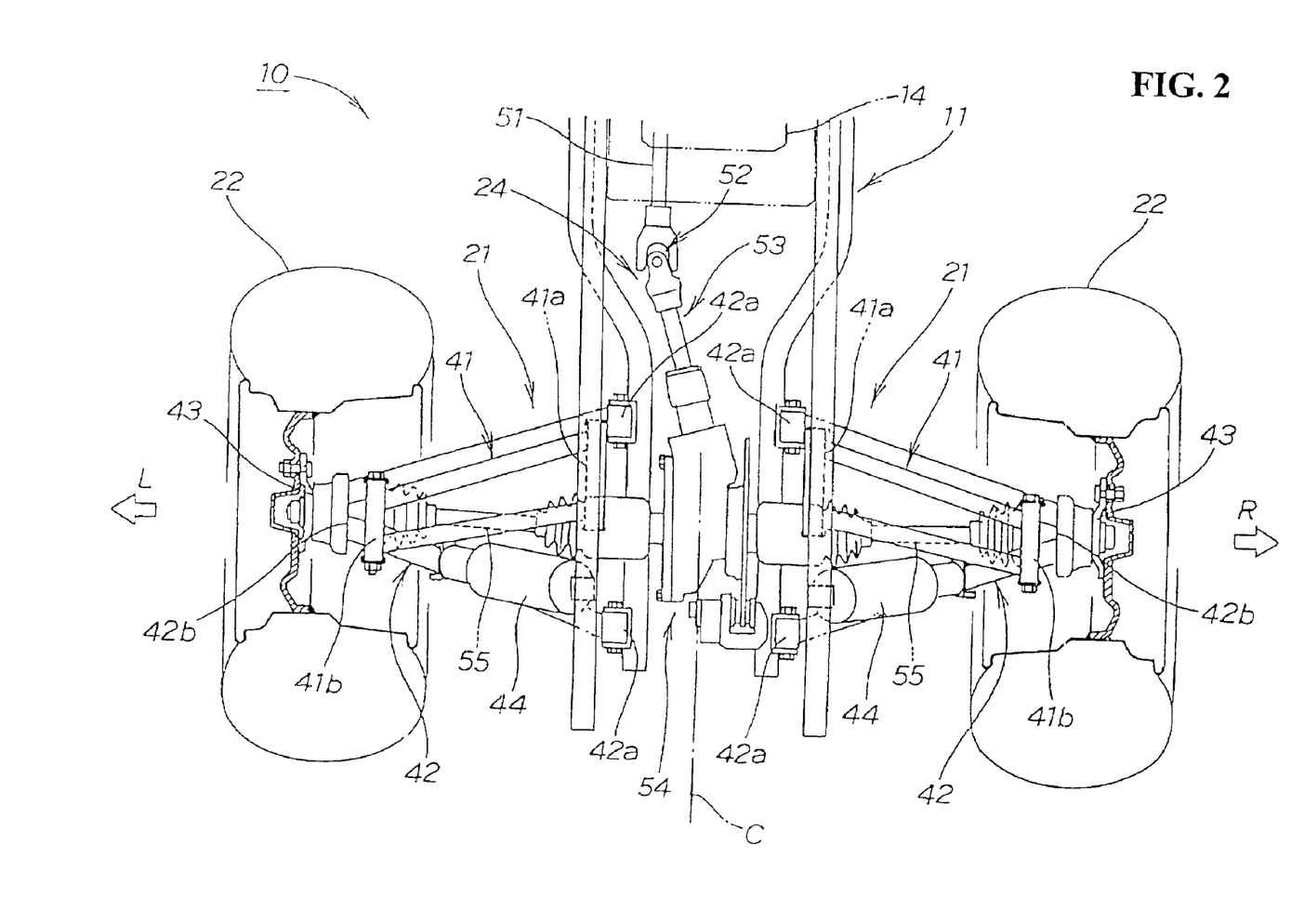
FIG. 2 is a plan view of the rear portion of the saddle riding type vehicle according to the present invention.

FIG. 2 is a plan view of the rear portion of the saddle riding type vehicle according to the present invention, showing the left and right suspension mechanisms 21, 21 on the side of the rear wheels 22, 22 and the power transmitting mechanism 24 on the side of the rear wheels 22, 22.

The left suspension mechanism 21 comprises a substantially square upper link 41 mounted on top of the vehicle body frame 11 at one side 41a for a swinging motion a V-shaped lower link 42 mounted under the vehicle body frame 11 at the opened extremities 42a, 42a for a swinging motion, a knuckle 43 for connecting the V-shaped extremity 42b of the lower link 42 and the opposite side 41b of the upper link 41 for a swinging motion, and thus supporting the rear wheel 22. The suspension also includes a cushion unit, or shock absorber 44 for absorbing impact by being interposed between the vehicle body frame 11 and the lower link 42.

The right suspension mechanism 21 is symmetrical to the left suspension mechanism 21 with respect to the center of the vehicle, and thus detailed description will not be made.

The power transmission mechanism 24 comprises a coupling 52 mounted on the output shaft 51 on the side of the power unit 14 (the engine 12 and the transmission 13), a propeller shaft 53 connected to the coupling 52 at one end, a final speed reducer 54 to which the other end of the propeller shaft 53 is connected, and the left and right drive shafts 55, 55 for transmitting rotation from the final speed reducer 54 to the left and right rear wheels 22, 22. The coupling 52 is one of the uneven velocity joints, called Universal joints, or Cardan-type joints.

The saddle riding type vehicle 10 is improved in the amount of movement of the wheels in the vertical directions by disposing the final speed reducer 54 at the center C of the vehicle 10, thus equalizing the length of the left and right drive shafts 55, 55.

Figure 3:
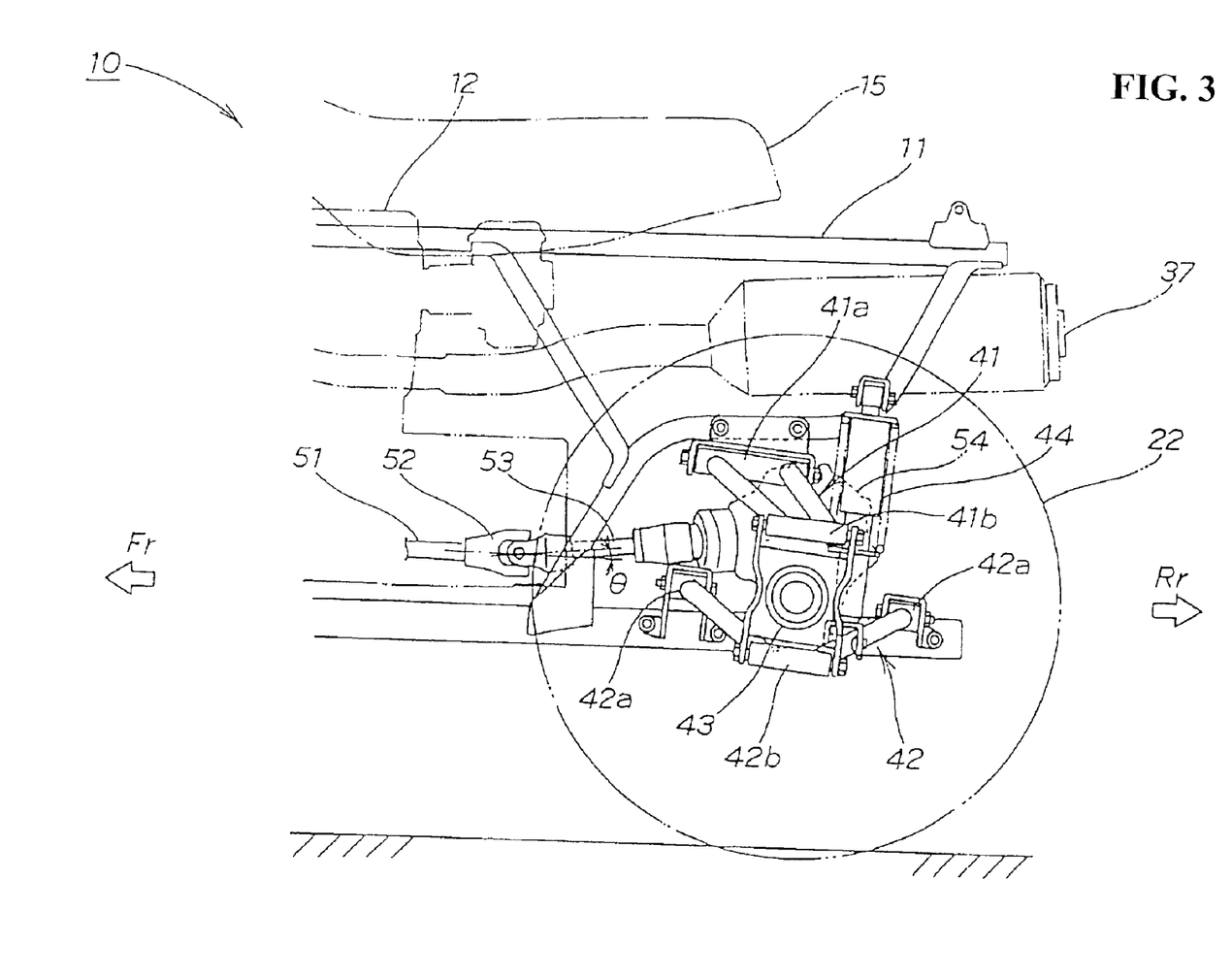
FIG. 3 is a side view of the rear portion of the saddle riding type vehicle according to the present invention.

FIG. 3 is a side view of the rear portion of the saddle riding type vehicle according to the present invention. The saddle riding type vehicle 10 is a vehicle comprising an engine 12 mounted at the center of the vehicle body frame 11, and a saddle seat 15 mounted above the engine 12, rear wheels 22, 22 (22 on one side is not shown) mounted on both sides of the rear portion of the vehicle body frame 11. Power of the engine 12 is transmitted to the rear wheels 22, 22 via the propeller shaft 53 and the final speed reducer 54, wherein the propeller shaft 53 is provided with a rising gradient from the engine 12 toward the final speed reducer 54 at the angle of θ.

Figure 4:
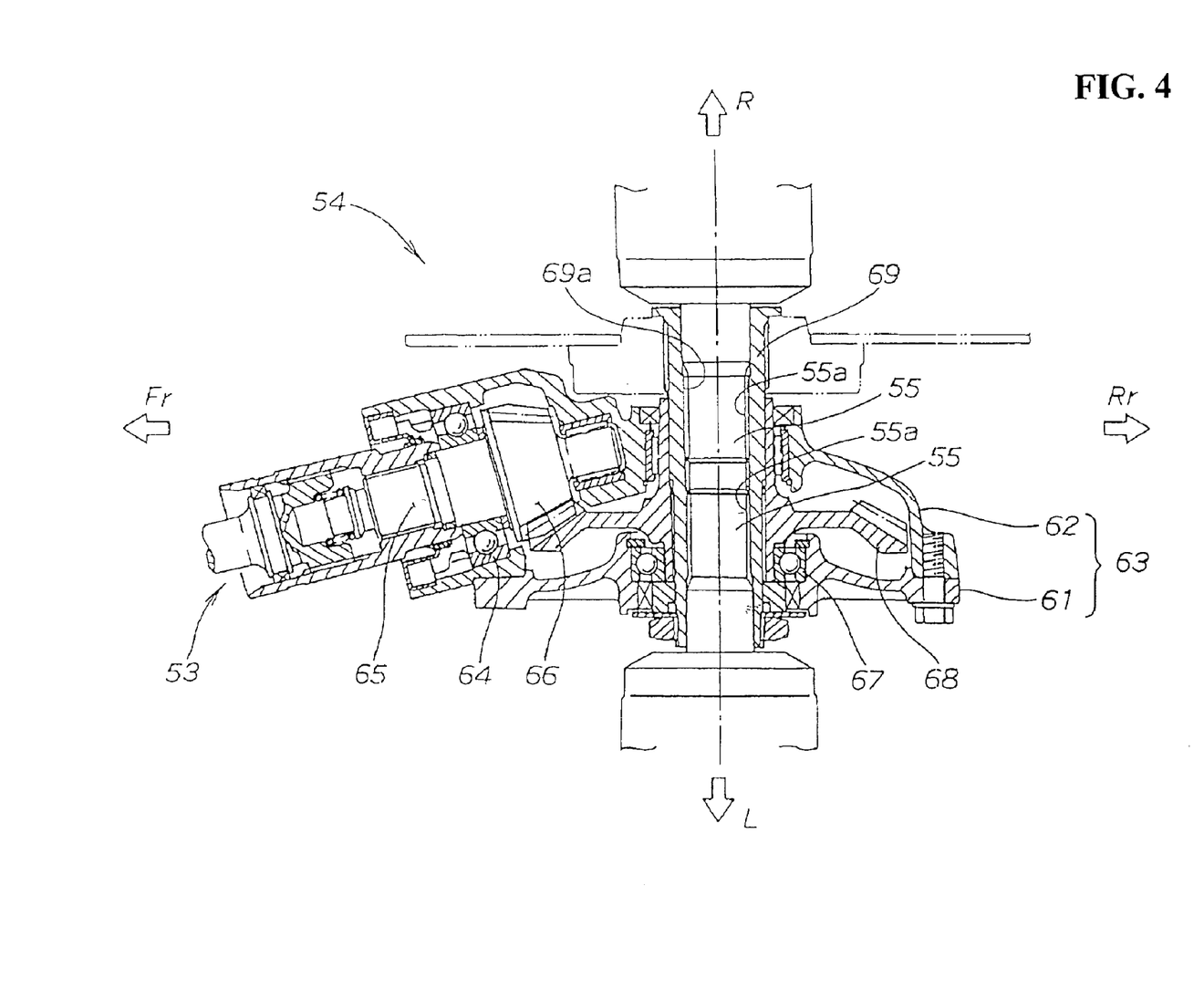
FIG. 4 is a plan view in cross section of the final speed reducer in the saddle riding type vehicle according to the present invention.

FIG. 4 is a plan view in cross section of the final speed reducer in the saddle riding type vehicle of the present invention. The final speed reducer 54 comprises a gear case 63 constructed of a cover portion 61 and a body portion 62, a transmission shaft 65 being rotatably supported by the gear case 63 via a bearing 64, a first gear 66 mounted at the end of the transmission shaft 65, a second gear 68 being engaged with the first gear 66 and being rotatably mounted in the gear case 63 via a bearing 67, and a connecting portion 69 to be connected to the left and right drive shafts 55, 55 via splines by being connected to the second gear 68. Also included are splines 55a, 55a formed on the left and right drive shafts 55, 55, and a spline 69a formed on the connecting portion 69.

Figure 5:
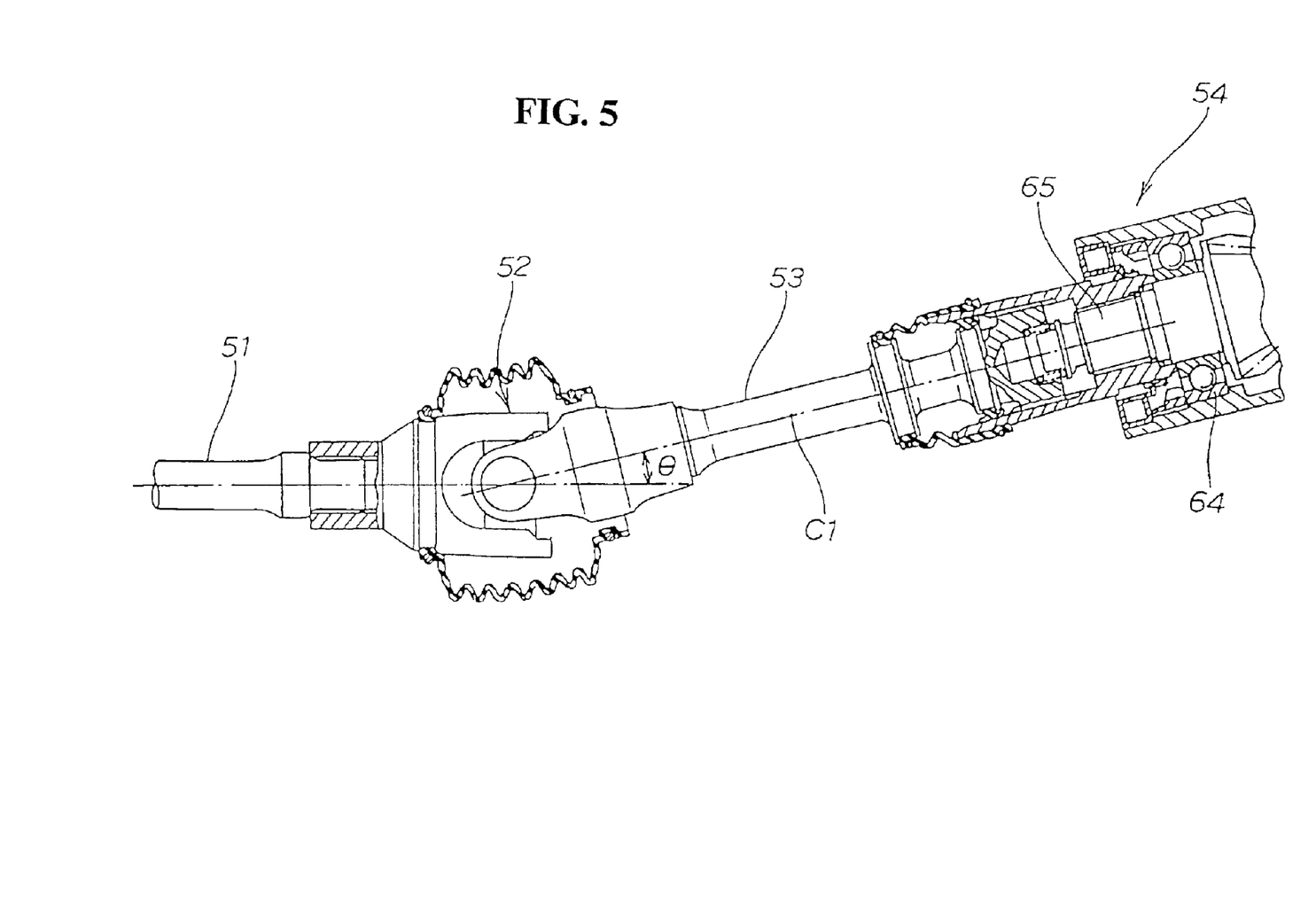
FIG. 5 is a side view of the portion around the propeller shaft in the saddle riding type vehicle according to the preset invention.

FIG. 5 is a side view of the portion around the propeller shaft in the saddle riding type vehicle according to the preset invention. The saddle riding type vehicle 10 (See FIG. 1) is a vehicle in which, by bringing the transmission shaft 65 on the side of the final speed reducer 54 for transmitting driving force from the propeller shaft 53 in line with the axis C1 of the propeller shaft 53, the final speed reducer 54 can be directly connected to the propeller shaft 53.

For example, when the transmission shaft on the side of the final speed reducer is not brought in line with the axis of the propeller shaft, it is necessary to connect the propeller shaft to the final speed reducer via a coupling or the like. Therefore, the transmission shaft 65 on the side of the final speed reducer 54 is brought in line with the axis C1 of the propeller shaft 53, thereby directly connecting the final speed reducer 54 directly to the propeller shaft 53. As a consequence, for example, the coupling can be eliminated, and thus the construction may be simplified.

Figure 6A:
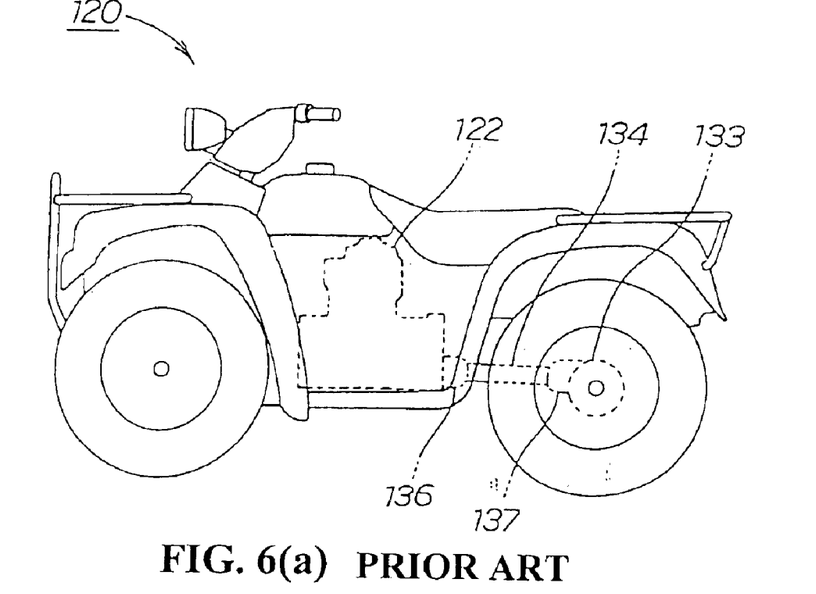
FIG. 6(a) is an explanatory drawing of saddle riding type vehicle 120 of a comparative example.

The operation of the saddle riding type vehicle 10 described above will be describe below. FIGS. 6(a), and (b) are explanatory drawings illustrating the operation of the saddle riding type vehicle according to the present invention, in which FIG. 6(a) is a saddle riding type vehicle 120 of a comparative example, and FIG. 6(b) is a saddle riding type vehicle 10 of an embodiment of the present invention.

In FIG. 6(a), the saddle riding type vehicle 120 is a vehicle in which a propeller shaft 134 is connected to the side of the engine 122 via a coupling 136 at one end, and to the final speed reducer 133 via a coupling 137 at the other end, and disposed in substantially parallel with the ground. As a consequence, the engine 122 could be disposed at the lower position, and thus the center of gravity could be lowered.

By arranging the propeller shaft 134 in substantially parallel with the ground, the final speed reducer 133 can be moved upward, and thus the suspension stroke could be improved. However, it is desired to give further room for the suspension stroke, in order to prevent limitations in the design or in the layout.

Figure 6B:
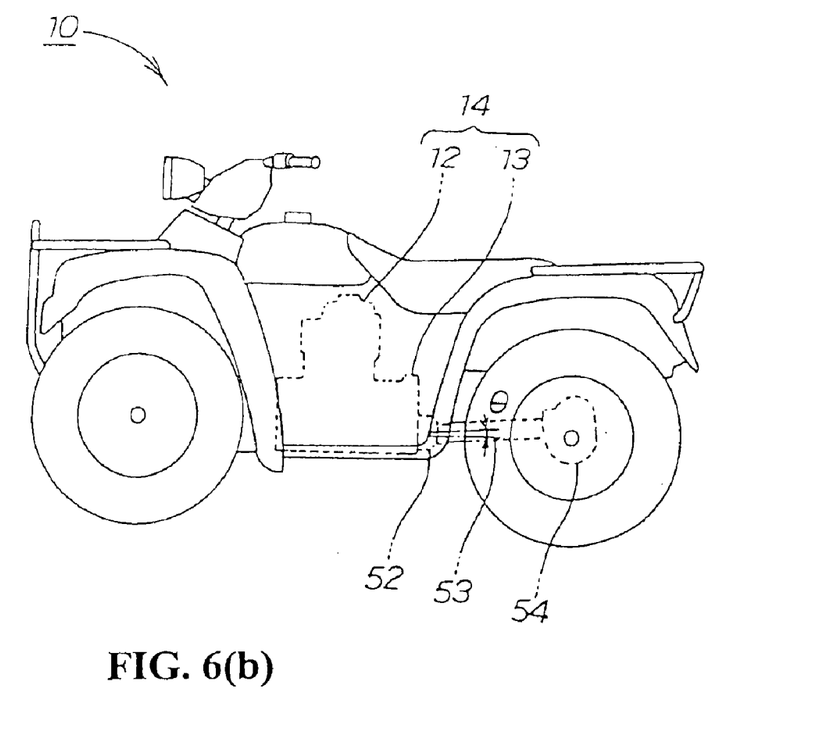
FIG. 6(b) is an explanatory drawing of a saddle riding type vehicle 10 of an embodiment of the present invention.

By comparison, in FIG. 6(b), in the saddle riding type vehicle 10, by providing the propeller shaft 53 a rising gradient from the engine 12 toward the final speed reducer 54, the final speed reducer 54 is provided at the upper position, that is, the final speed reducer 54 is disposed at the high position from the ground, so that the sufficient suspension stroke is obtained. As a consequence, the design freedom or layout freedom is expanded.

By providing the propeller shaft 53 a rising gradient from the engine 12 toward the final speed reducer 54, the heavy engine 12 is disposed at the lower position of the vehicle body frame 11 (See FIG. 1), so that the center of gravity can further be lowered. In addition, since the final speed reducer 54 is directly connected to the propeller shaft 53, the coupling or the like on the side of the final speed reducer 54 may be eliminated, and thus the construction may be simplified.

Figure 7:
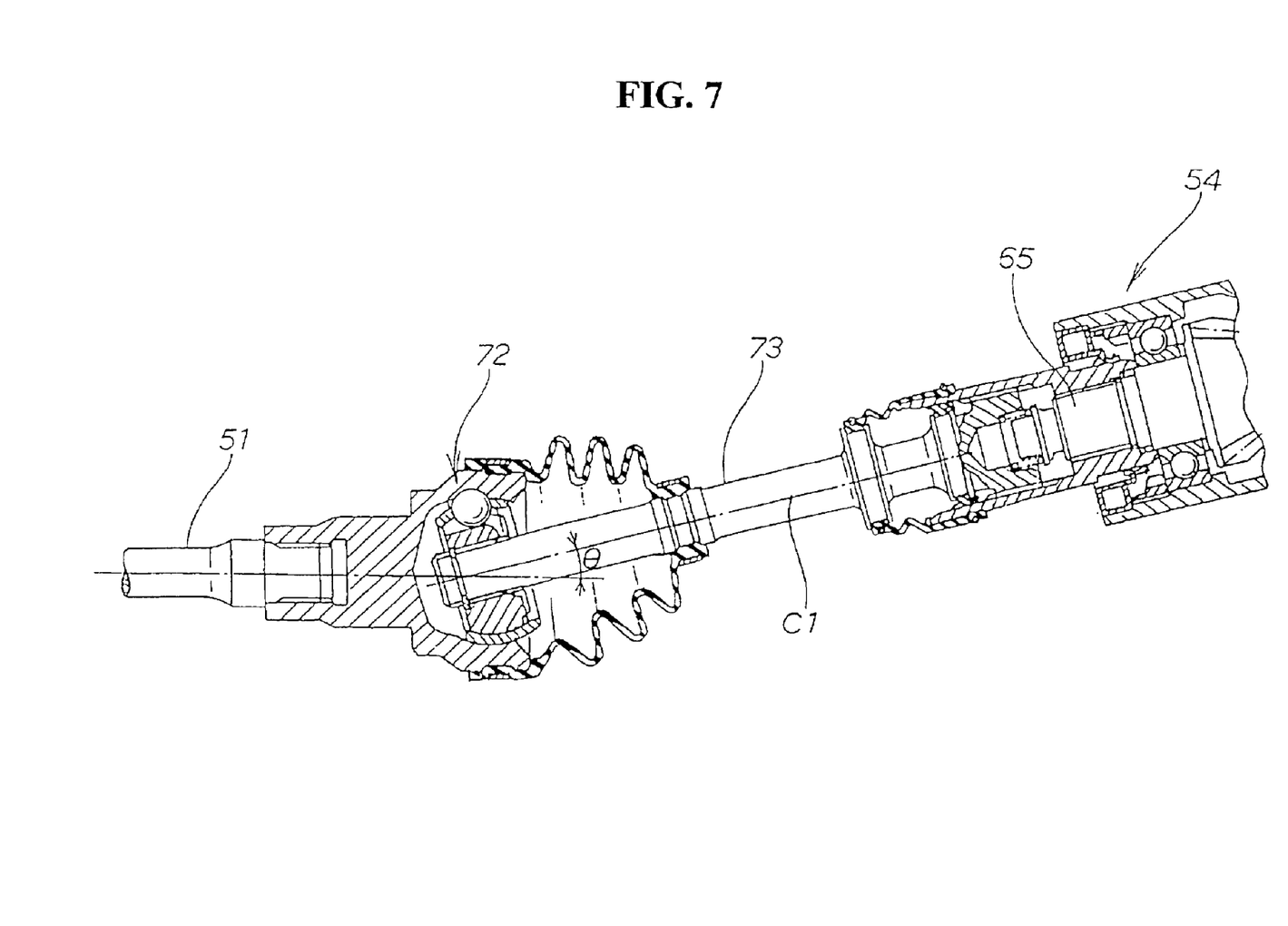
FIG. 7 is a plan view of another embodiment of the joint to be connected to one end of the propeller shaft in the saddle riding type vehicle according to the present invention.

FIG. 7 is a plan view of another embodiment of the joint to be connected to one end of the propeller shaft in the saddle riding type vehicle according to the present invention. This second embodiment includes an output shaft 51, a final speed reducer 54, a transmission shaft 65, a coupling 72 of constant velocity type, called a constant velocity ball joint, a propeller shaft 73, and a propeller shaft 73 having an axis C1. It can be seen that the propeller shaft 73 is connected to the output shaft 51 via the constant velocity ball joint 72.

In other words, by employing the constant velocity ball joint 72, for example, when the propeller shaft 73 is used at a large angle with respect to the output shaft 51, rotation of the engine 12 (See FIG. 1) can be transmitted to the propeller shaft 73.

As shown in FIG. 4, though the gear type in which the left and right drive shafts 55 are rotated at the equal velocity is employed in the final speed reducer 54 in the embodiments described above, it is not limited thereto and an differential gear may be employed in the final speed reducer, and any type of the coupling may be used.

With the construction described thus far, the present invention provides following advantages. Specifically, since the propeller shaft is provided with a rising gradient from the engine to the final speed reducer, the final speed reducer may be disposed at the upper position, that is, the final speed reducer is disposed at the high position from the ground, so that the sufficient suspension stroke is obtained. As a consequence, the design freedom or layout freedom may be expanded.

By providing the propeller shaft a rising gradient from the engine toward the final speed reducer, the heavy engine is disposed at the lower position of the vehicle body frame, so that the center of gravity can further be lowered.

In addition, by bringing the transmission shaft on the side of the final speed reducer for transmitting driving force from the propeller in line with the axis of the propeller shaft, the final speed reducer is directly connected to the propeller shaft. For example, when the transmission shaft on the side of the final speed reducer is not brought in line with the axis of the propeller shaft, it is necessary to connect the propeller shaft to the final speed reducer via a coupling or the like. Therefore, the transmission shaft on the side of the final speed reducer is brought in line with the axis of the propeller shaft to connect the final speed reducer directly to the propeller shaft. As a consequence, for example, the coupling can be eliminated, and thus the construction may be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle riding vehicle comprising:
   a vehicle body frame having a front and a rear portion;
   an engine mounted at a center of the vehicle body frame;
   a saddle seat provided above the engine;
   rear wheels mounted on both sides of the rear portion of the vehicle body frame;
   a final speed reducer for transmitting power of the engine to the rear wheels, a forward end of the final speed reducer having an axis extending in a forward direction at a predetermined angle downwardly and laterally with respect to a longitudinal center line of the vehicle;
   a transmission shaft attached to the forward end of the final speed reducer; and
   a propeller shaft connected to a forward end of the transmission shaft;
   wherein the propeller shaft and the transmission shaft extend co-axially from the final speed reducer toward the engine along the axis of the forward end of the final speed reducer.

2. The saddle riding vehicle according to claim 1, further comprising a universal joint connecting the propeller shaft and an output shaft.

3. The saddle riding vehicle according to claim 1, wherein the final speed reducer is disposed on the longitudinal center line of the vehicle, thus equalizing lengths of a left and a right drive shaft connecting to the rear wheels.

4. The saddle riding vehicle according to claim 1, wherein the final speed reducer includes:
   a gear case constructed of a cover portion and a body portion, the transmission shaft being rotatably supported by the gear case via a first bearing, a first gear mounted at an end of the transmission shaft,
   a second gear being engaged with the first gear and being rotatably mounted in the gear case via a second bearing, and
   a connecting portion to be connected to the left and right drive shafts via splines by being connected to the second gear.

5. The saddle riding vehicle according to claim 4, wherein an axis of the second bearing is co-axial to the axis of the forward end of the final speed reducer.

6. The saddle riding vehicle according to claim 1, wherein a front end of a transmission shaft of the final speed reducer is offset to the left side of the longitudinal center line of the vehicle and a rear end of the transmission shaft lies substantially on the longitudinal center line of the vehicle.

7. The saddle riding vehicle according to claim 1, wherein an axis of a first gear of the final speed reducer is not perpendicular to the drive shafts connected to the rear wheels of the vehicle and is not parallel to the longitudinal center line of the vehicle.

8. The saddle riding vehicle according to claim 1, wherein the propeller shaft and the transmission shaft are separate from each other.

9. A four wheel vehicle comprising:
   a vehicle body frame having a front and rear portion;
   an engine mounted at a center of the vehicle body frame;
   a saddle seat provided above the engine;
   rear wheels mounted on both sides of the rear portion of the vehicle body frame;
   a final speed reducer for transmitting power of the engine to the rear wheels, a first gear of the final speed reducer having an axis extending in a forward direction at a predetermined angle downwardly and laterally with respect to a longitudinal center line of the vehicle;
   a transmission shaft attached to the forward end of the final speed reducer; and
   a propeller shaft connected to a forward end of the transmission shaft;
   wherein the propeller shaft and the transmission shaft extend co-axially from the final speed reducer toward the engine along the axis of the first gear of the final speed reducer.

10. The four wheel vehicle according to claim 9, further comprising a velocity ball joint connecting the propeller shaft and output shaft.

11. The four wheel vehicle according to claim 9, wherein the final speed reducer includes:
    a gear case constructed of a cover portion and a body portion, the transmission shaft being rotatably supported by the gear case via a first bearing,
    the first gear being mounted at an end of the transmission shaft, a second gear being engaged with the first gear and being rotatably mounted in the gear case via second bearing, and
    a connecting portion to be connected to the left and right drive shafts via splines by being connected to the second gear.

12. The four wheel vehicle according to claim 11, wherein an axis of the second bearing is co-axial to the axis of the first gear of the final speed reducer.

13. The four wheel vehicle according to claim 9, further comprising a left and a right drive shaft connected to the rear wheels, the left and right drive shafts having generally equal lengths with the final speed reducer being disposed on the longitudinal center line of the vehicle.

14. The four wheel vehicle according to claim 9, wherein the propeller shaft and the transmission shaft are separate from each other.

* * * * *